United States Patent [19]

Sugano et al.

[11] Patent Number: 4,667,783
[45] Date of Patent: May 26, 1987

[54] PARK LOCK DEVICE FOR USE WITH AUTOMATIC TRANSMISSION

[75] Inventors: Kazuhiko Sugano, Yokohama; Koichi Hayasaki, Fujisawa, both of Japan

[73] Assignee: Nissan Motor Co., Ltd., Yokohama, Japan

[21] Appl. No.: 658,212

[22] Filed: Oct. 5, 1984

[30] Foreign Application Priority Data

Oct. 14, 1983 [JP] Japan .................. 58-190672

[51] Int. Cl.$^4$ .................. B60K 41/26; B60T 1/06
[52] U.S. Cl. .................. 192/4 A; 74/411.5; 74/577 S; 188/31
[58] Field of Search .................. 188/69, 31, 265; 74/411.5, 577 S; 192/4 A

[56] References Cited

U.S. PATENT DOCUMENTS

| | | | |
|---|---|---|---|
| 2,875,856 | 3/1959 | Mrlik et al. | 192/4 A X |
| 3,300,001 | 1/1967 | Stockton | 192/4 A |
| 3,601,231 | 8/1971 | Kolacz et al. | 188/69 |
| 3,690,416 | 9/1972 | Yamada | 188/31 |
| 3,912,050 | 10/1975 | Iwanga et al. | 188/69 |
| 3,990,541 | 11/1976 | Dobrinska et al. | 188/69 |
| 4,031,977 | 6/1977 | Grosseau | 188/31 |
| 4,223,768 | 9/1980 | Iwanga | 188/69 |
| 4,252,219 | 2/1981 | Kauffman | 188/69 |
| 4,275,609 | 6/1981 | DeLaney | 74/411.5 |
| 4,310,081 | 1/1982 | Kolacz | 192/4 |
| 4,519,483 | 5/1985 | Schlicker | 74/411.5 |

FOREIGN PATENT DOCUMENTS

| | | |
|---|---|---|
| 1630896 | 7/1971 | Fed. Rep. of Germany . |
| 2427216 | 1/1975 | Fed. Rep. of Germany ........ 188/69 |
| 1468492 | 3/1977 | United Kingdom . |

Primary Examiner—Allan D. Herrmann
Attorney, Agent, or Firm—Schwartz, Jeffery, Schwaab, Mack, Blumenthal & Evans

[57] ABSTRACT

Herein disclosed is an improved arrangement of a park lock device for use with an automatic transmission, by which the transmission casing can be constructed simple and compact in size. The park lock device comprises a parking gear secured to the output shaft of the transmission to rotate therewith; a parking pawl pivotally connected to the casing to lock and unlock the parking gear, the pawl including first and second wing portions which extend in the opposed directions from the pivoted portion of the pawl, the first wing portion being formed with a tooth lockably engageable with a tooth gap of the parking gear; and an actuating mechanism having a cam member which is slidably engageable with the second wing portion to pivot the parking pawl in a direction to achieve the locking engagement between the tooth of the parking pawl and the tooth gap of the parking gear. The actuating mechanism is positioned essentially inboard of the parking pawl with respect to the transmission casing.

4 Claims, 4 Drawing Figures

FIG.1
(PRIOR ART)
FIG.2
(PRIOR ART)
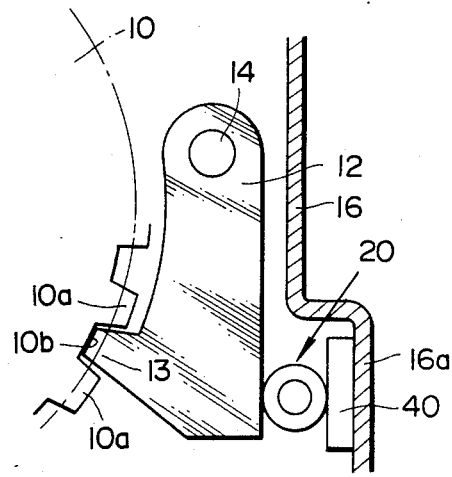
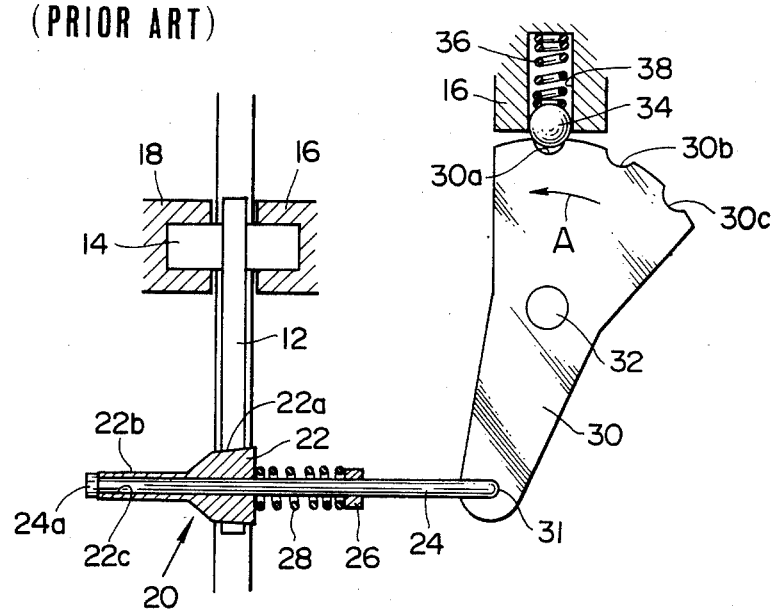

PARK LOCK DEVICE FOR USE WITH AUTOMATIC TRANSMISSION

BACKGROUND OF THE INVENTION

The present invention relates in general to a parking brake of a motor vehicle, and more particularly to a park lock device for use with a motor vehicle automatic transmission.

Hitherto, there have been proposed various kinds of park lock devices for use with an automatic transmission. Some are of a type including a parking gear securedly mounted on the output shaft of the transmission and a parking pawl which is lockably engageable with the parking gear to achieve locking of the output shaft.

However, due to the arrangement of the above mentioned parts, the transmission casing tends to become unwantedly bulky and complex inducing design problems when a transmission having such a park lock device is disposed in the crowded engine room of a F-F (front wheel, front engine) type vehicle.

SUMMARY OF THE INVENTION

It is therefore an essential object of the present invention to provide an improved park lock device for use with an automatic transmission, which device allows compact and simple transmission casing construction.

According to the present invention, there is provided, in an automatic transmission having an output shaft and a transmission casing, a park lock device which comprises a parking gear coaxially and securedly mounted on the output shaft to rotate therewith, a parking pawl pivotally connected to the casing for locking and unlocking the parking gear, the pawl including first and second wing portions which extend in the opposed directions from the pivoted portion of the pawl, the first wing portion being formed with a tooth engageable with a teeth gap of the parking gear, and an actuating mechanism having a cam member which is slidably engageable with the second wing portion thereby to pivot the parking pawl in a direction to achieve the locking engagement between the tooth of the pawl and the teeth gap of the parking gear, the actuating mechanism being positioned essentially inboard of the parking pawl with respect to the transmission casing.

BRIEF DESCRIPTION OF THE DRAWINGS

Other objects and advantages of the present invention will become apparent from the following description when taken in conjunction with the accompanying drawings, in which:

FIG. 1 is a front view of a prior art park lock device for use with an automatic transmission;

FIG. 2 is a side view of the prior art park lock device;

DETAILED DIESCRIPTION OF THE PRESENT INVENTION

Figure 3:
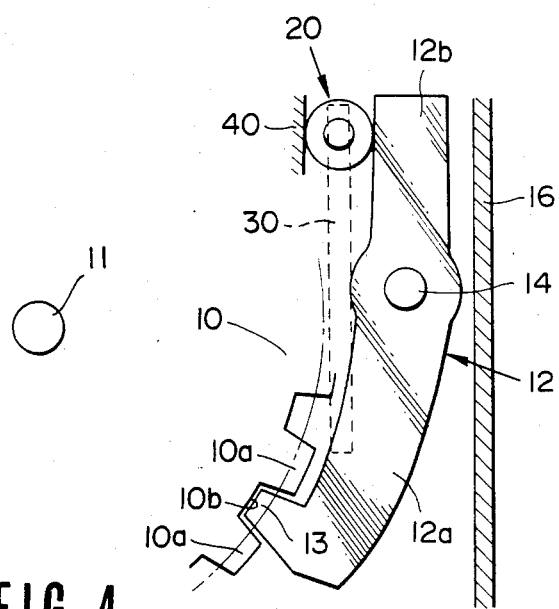
FIG. 3 is a front view of an improved park lock device for use with an automatic transmission, according to the present invention.
Figure 4:
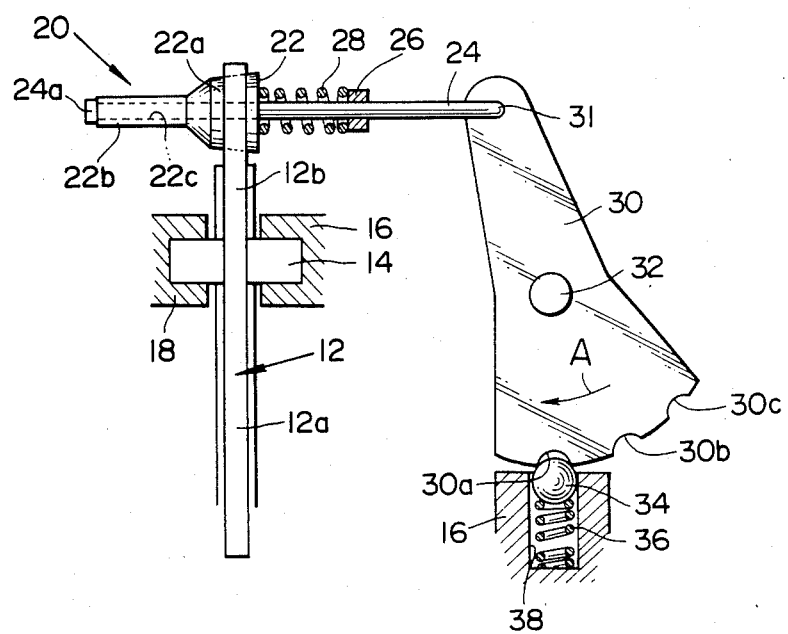
FIG. 4 is a side view of the improved park lock device of the present invention.

Referring to FIGS. 3 and 4, there is schematically shown a park lock device according to the present invention. In the drawings, numeral 10 denotes a parking gear which is coaxially and securedly mounted on an output shaft 11 of the transmission to rotate therewith, and numeral 12 denotes an arcuate parking pawl for locking the parking gear 10 and thus the output shaft of the transmission. The parking pawl 12 is formed at one end with a tooth 13 which is lockably engageable with a gap 10b defined between adjacent two teeth 10a and 10a of the parking gear 10. The parking pawl 12 is pivotally connected at its intermediate portion to the transmission casing 16 through its intermediate portion to the transmission casing 16 through a pivot shaft 14. The pawl 12 comprises first and second wing portions 12a and 12b which extend in the opposed directions from the pivoted portion. As is seen from FIG. 4, the pivot shaft 14 is supported by both the casing 16 and a side cover 18 of the transmission. Although not shown in the drawings, a return spring is arranged to bias the parking pawl 12 in a direction to disengage from the parking gear 10. At a position near the second wing portion 12b of the parking pawl 12 and between the pawl 12 and the parking gear 10, there is arranged an actuating mechanism 20 which functions to actuate the parking pawl 12 in response to movement of a manual shift lever (not shown) located near the driver's seat.

The actuating mechanism 20 comprises a generally funnel-shaped cam member 22 which is contactable at its cylindrical outer surface with the second wing portion 12b of the parking pawl 12 and axially movable in a direction parallel with the pivot axis 14 of the parking pawl 12. The cam member 22 comprises a larger diameter annular portion 22a and a smaller diameter tubular portion 22b which are coaxially arranged and integrated with each other, as shown. The annular portion 22a includes two tapered cylindrical outer surfaces (no numerals) to serve as a cam. The cam member 22 is formed with an axially extending through bore 22c through which a supporting shaft 24 passes slidably. The shaft 24 is formed with an enlarged head portion 24a by which the leftward movement of the cam member 22 in FIG. 4 relative to the supporting shaft 24 is restricted. A spring seat 26 is secured to the supporting shaft 24 for compressing a coil spring 28 between it and the cam member 22, so that the cam member 22 is biased leftward in FIG. 4 relative to the shaft 24. The rightward end of the shaft 24 is bent to be pivotally engaged with an opening 31 formed in an end portion of a pivotal plate 30. The pivotal plate 30 is pivotally connected at its intermediate portion to the transmission casing 16 through a pivot shaft 32.

The other end portion, which is sectoral in shape, of the pivotal plate 30 is formed with a plurality (three in the illustrated example) of spaced recesses 30a, 30b and 30c with which a detent ball 34 is selectively engageable. The detend ball 34 is biased toward the pivotal plate 30 by a spring 36 disposed in a blind bore 38 of the casing 16, so that the pivotal movement of the pivotal plate 30 about the pivot shaft 32 is carried out with a detent feeling. Although not shown in the drawings, a known link mechanism is operatively connected to the pivotal plate 30 to transmit the movement of the manual shift lever to the plate 30 and thus the supporting shaft 24 of the cam member 22.

It is now to be noted that in the invention, the actuating mechanism 20 as mentioned hereinabove is positioned inboard of the parking pawl 12 with respect to the transmission casing 16. Furthermore, the arcuate parking pawl 12 is gently curved toward the parking gear 10, as is seen from FIG. 3.

When, in operation, the manual shift lever is shifted to the "parking" position, the pivot plate 30 is pivoted counterclockwise in FIG. 4 to assume the illustrated position engaging the recess 30a thereof with the detent ball 34. With this, the shaft 24 moves leftward urging, with aid of the spring 28, the cam member 22 leftward. Thus, when, under this condition, the tooth 13 of the parking pawl 12 is in alignment with the teeth gap 10b of the parking gear 10, the cam member 22 is moved to the position as shown in FIG. 4 wherein the most raised cam surface of the cam member 22 engages with the second wing portion 12b of the parking pawl 12 pivoting the pawl 12 clockwise in FIG. 3 thereby lockingly inserting the tooth 13 into the gap 10b to achieve locking of the parking gear 10 and thus the output shaft of the transmission. Under this park lock condition, the most raised cam surface of the cam member 22 is frictionally sandwiched between the second wing portion 12b of the parking pawl 12 and an actuator supporter 40 (see FIG. 3) fixed to the casing 16, so that incidental disengagement of the parking pawl 12 from the parking gear 10 is assuredly prevented.

While, when the tooth 12a of the parking pawl 12 is not aligned with the gap 10b of the parking gear 10 upon shifting of the manual shift lever to the "parking" position, the leftward movement of the supporting shaft 24 does not induce the leftward movement of the cam member 22 because of the immobility of the parking pawl 12 due to the top-to-top engagement between the tooth 13 of the parking pawl 12 and one tooth 10a of the parking gear 10. However, under this condition, the cam member 22 is strongly biased leftward by the highly compressed spring 28. Thus, when, thereafter, an adjacent teeth gap 10b is brought into alignment with the tooth 12a of the parking pawl 12 due to slight movement of the vehicle, the cam member 22 is moved leftward putting the tooth 13 into the gap 10b. With this, the park lock is achieved.

When thereafter the manual shift lever is shifted to another position, for example, "drive" position, the pivotal plate 30 is pivoted in the direction of the arrow A producing the detent feeling. With this, the supporting shaft 24 moves rightward forcing the head portion 24a thereof to push the cam member 22 in the same direction thereby disengaging the most raised cam surface of the cam member 22 from the parking pawl 12. With this, the parking pawl 12 is pivoted back to its inoperative position by the force of the return spring (not shown), so that the parking lock is cancelled. Under this condition, the second wing portion 12b of the parking pawl 12 is in contact with the smaller diameter tubular portion 22b of the cam member 22.

In the following, constructional features of the present invention will be itemized.

(1) The actuating mechanism 20 including the cam member 22 is located inboard of the parking pawl 12 with respect to the transmission casing 16. With this arrangement, the transmission casing 16 can be constructed in a simple manner and is compact in size. This feature will be well understood when comparing with a prior art park lock device as shown in FIGS. 1 and 2 in which identical parts to those of the invention are designated by the same numerals. (This prior art device is disclosed in Japanese Utility Model Application First Publications Nos. 57-19156, 57-65154 and 57-65155). As is understood from FIG. 1, the actuating mechanism 20 in this prior art device is arranged at a back side of the parking pawl 12. This arrangement however induces a bulky and complicated construction of the transmission casing 16 because the casing 16 has inevitably an expanded portion 16a at the portion where the actuating mechanism 20 is positioned. As is known, bulky and complicated construction of the transmission brings about a severe problem especially when it is applied to F.F (front engine front drive) type motor vehicles. That is, the engine room of the F.F type vehicles has a limited part mounting space because it has to contain therein a greater number of parts as compared with the F.R (front engine rear drive) type motor vehicles. However, in the invention, there is no need for providing the transmission casing 16 with such expanded portion 16a because of the unique arrangement of the park lock device.

(2) The arcuate shape of the parking pawl 12 can place the pawl 12 very close to the transmission casing 16 because outward projection of the leading ends of the first and second wing portions 12a and 12b of the pawl 12 relative to the pivot shaft 14 can be minimized upon pivotal movement of the pawl 12 about the shaft 14. This feature also induces compact construction of the transmission casing 16.

(3) The parking pawl 12 is pivoted at its intermediate portion and has the first and second wing portions 12a and 12b extending in the opposed directions from the pivoted portion. The first wing portion is formed with a tooth 13 engageable with the tooth gap 10b of the parking gear 10 and the second wing portion is directly actuated by the actuating mechanism 20. Thus, by providing the pawl 12 with a longer first wing portion and a shorter second wing portion like in the illustrated embodiment (see FIG. 3), the locking and unlocking movement of the parking pawl 12 relative to the parking gear 10 is highly magnified even when the actuation of the cam member 22 to the shorter second wing portion is small. This advantageous feature is not expected from the prior art device of FIGS. 1 and 2.

What is claimed is:

1. In an automatic transmission having an output shaft and a transmission casing, a park lock device comprising:
   a parking gear coaxially and securedly mounted on said output shaft to rotate therewith;
   a parking pawl having an axis pivotally connected to said casing for locking and unlocking said parking gear, said pawl including first and second wing portions which extend in opposing directions from the pivoted connection of the pawl, said first wing portion being formed with a tooth engageable with one of a plurality of tooth gaps of said parking gear;
   an actuating mechanism, including:
   a support shaft;
   a cam member secured along an axial length of said support shaft and being slidably engageable with said second wing portion thereby to reversibly pivot said parking pawl in a direction to achieve locking engagement between the tooth of the pawl and the tooth gap of said parking gear, said actuating mechanism being positioned essentially inboard of said parking pawl with respect to the transmission casing;
   wherein said first wing portion is arcuate and said second wing portion is shorter in length than said first wing portion, wherein said park lock device further includes positioning means for moving said support shaft in an axial direction and thereby positioning said cam member to achieve said reversible pivot of said parking pawl, said positioning means including a pivot plate secured at a first end to said supporting shaft and at a second end to a detent producing means, wherein said pivot plate pivots in a direction parallel to an inboard surface of said transmission casing.

2. An automatic transmission as claimed in claim 1, wherein said detent producing means includes:

a plurality of spaced recesses in said second end of said pivot plate;

a detent ball selectively engageable with said spaced recesses; and a spring biasing said detent ball toward said pivot plate, said spring being received in a blind bore.

3. An automatic transmission as claimed in claim 1, wherein supporting shaft extends substantially parallel with the axis of said parking pawl.

4. An automatic transmission as claimed in claim 1, wherein the portion of said transmission casing adjacent said park lock device is flat.

* * * * *